Figure 1:
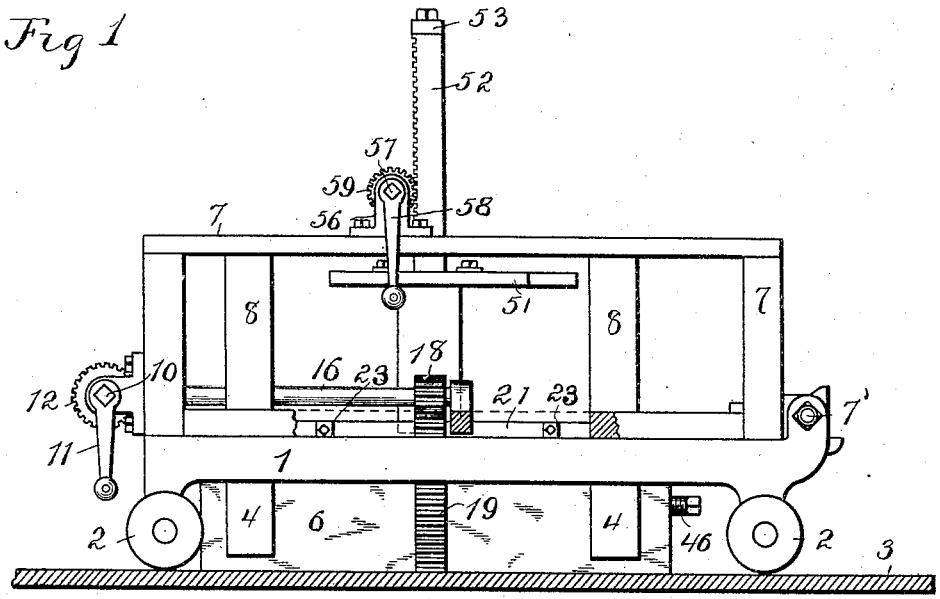

No. 773,709. PATENTED NOV. 1, 1904.
P. L. BRITAIN.
BUILDING BLOCK MOLDING MACHINE.
APPLICATION FILED AUG. 3, 1903.
NO MODEL. 9 SHEETS—SHEET 1.

WITNESSES:
R. E. Hamilton.
L. R. Barker.

INVENTOR
Perry L. Britain
By Warren D. Hoase
His Attorney

No. 773,709. PATENTED NOV. 1, 1904.
P. L. BRITAIN.
BUILDING BLOCK MOLDING MACHINE.
APPLICATION FILED AUG. 3, 1903.
NO MODEL. 9 SHEETS—SHEET 2.

WITNESSES:
R. E. Hamilton.
L. R. Barker.

INVENTOR
Perry L. Britain
By Warren D. House,
His Attorney

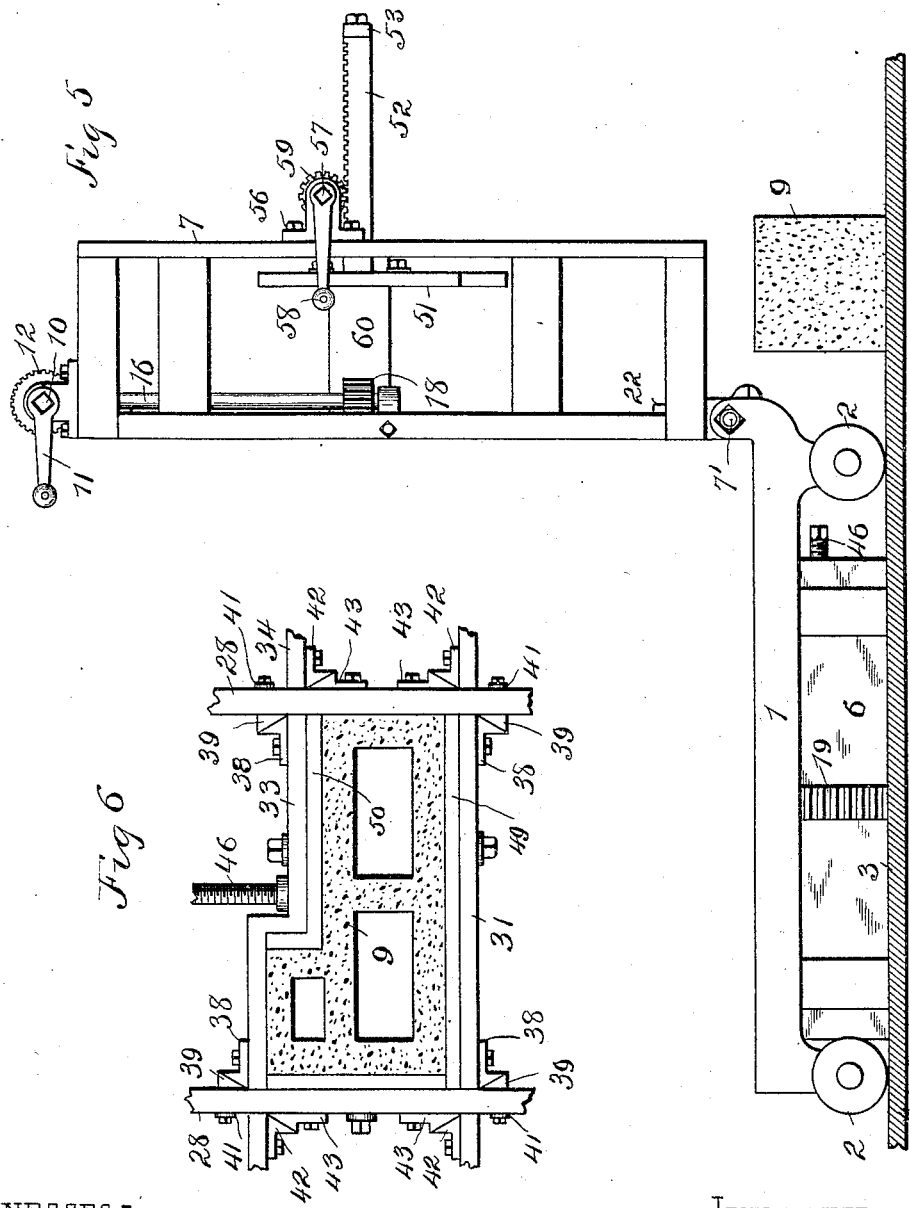

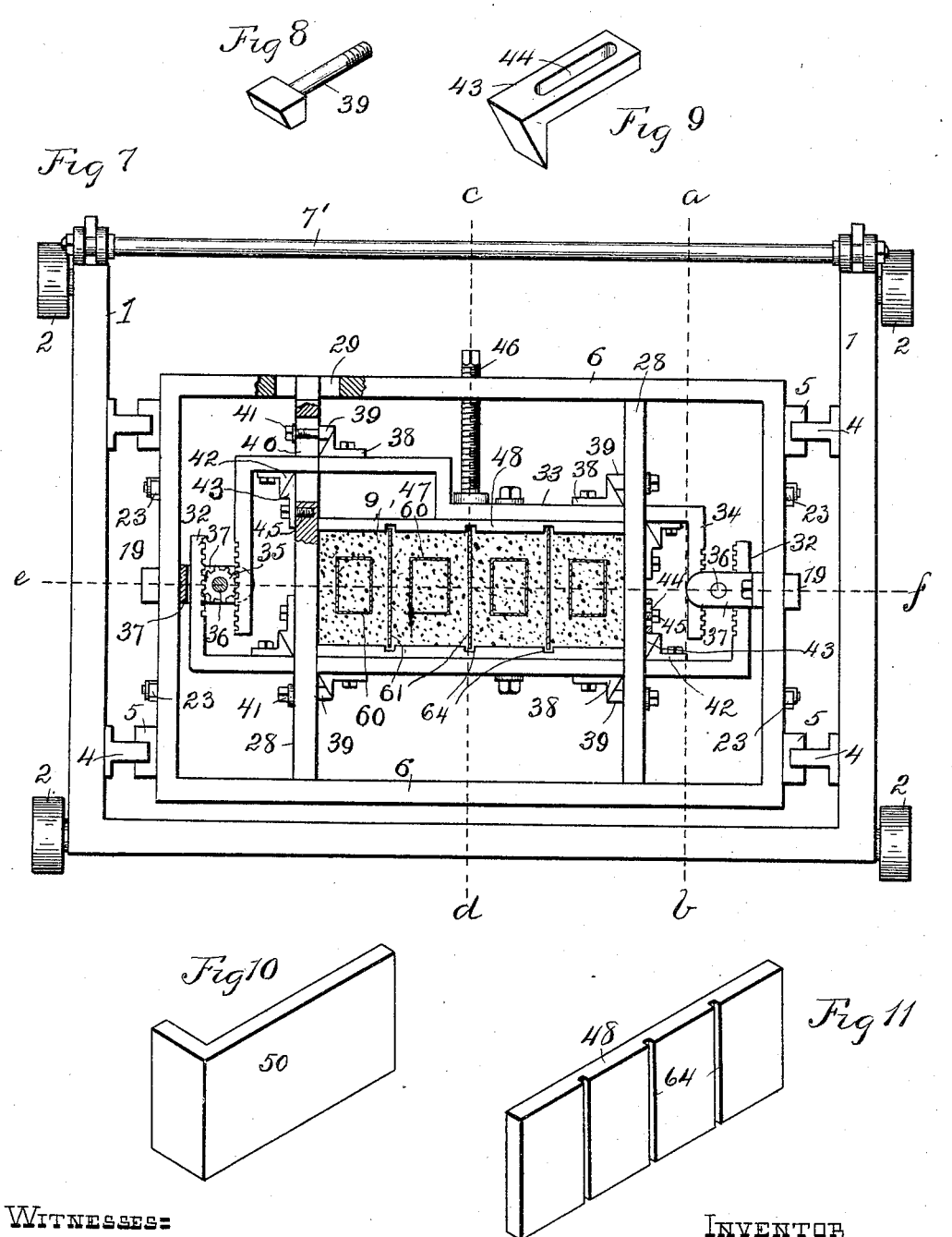

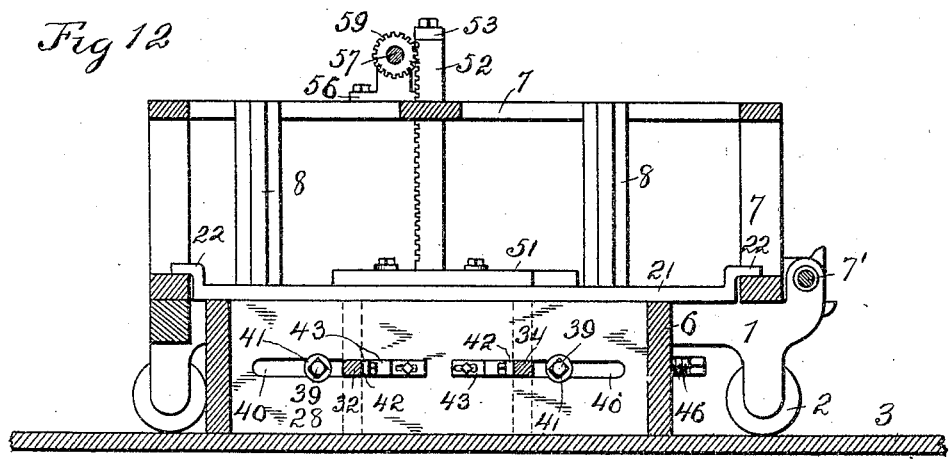
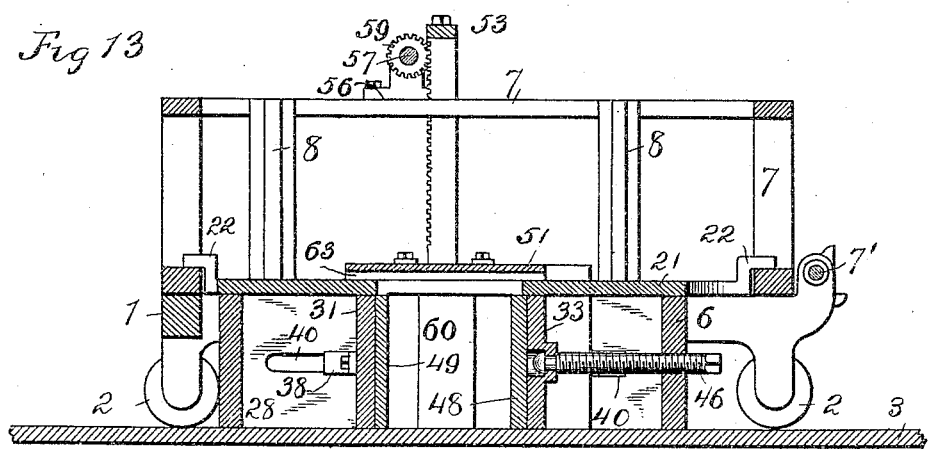
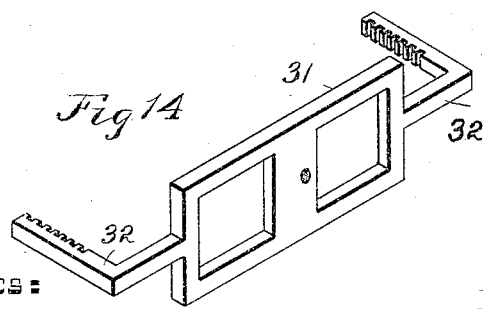

No. 773,709. PATENTED NOV. 1, 1904.
P. L. BRITAIN.
BUILDING BLOCK MOLDING MACHINE.
APPLICATION FILED AUG. 3, 1903.
NO MODEL. 9 SHEETS—SHEET 6.
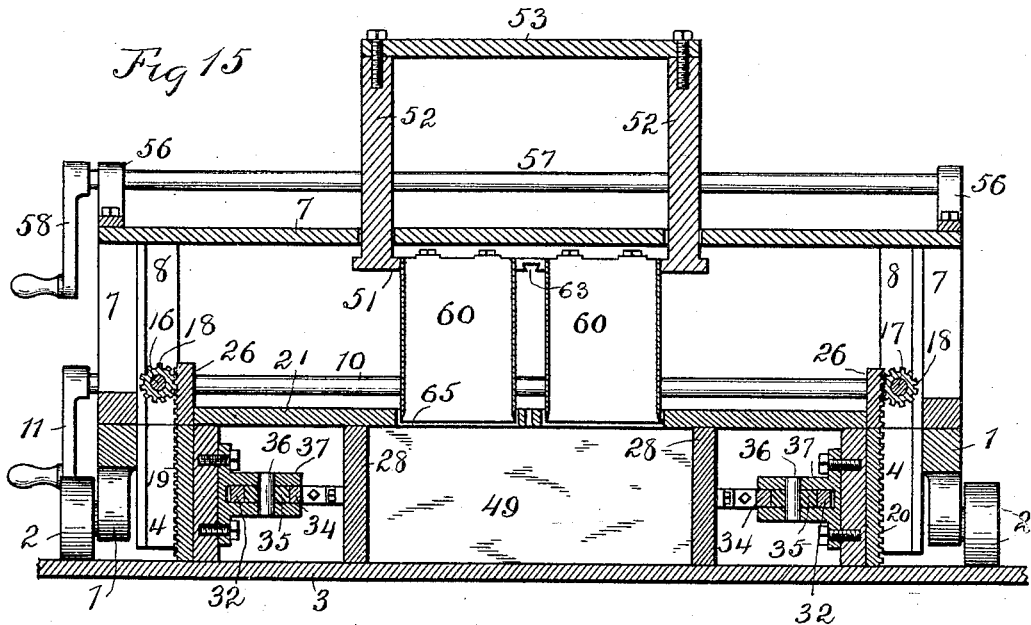
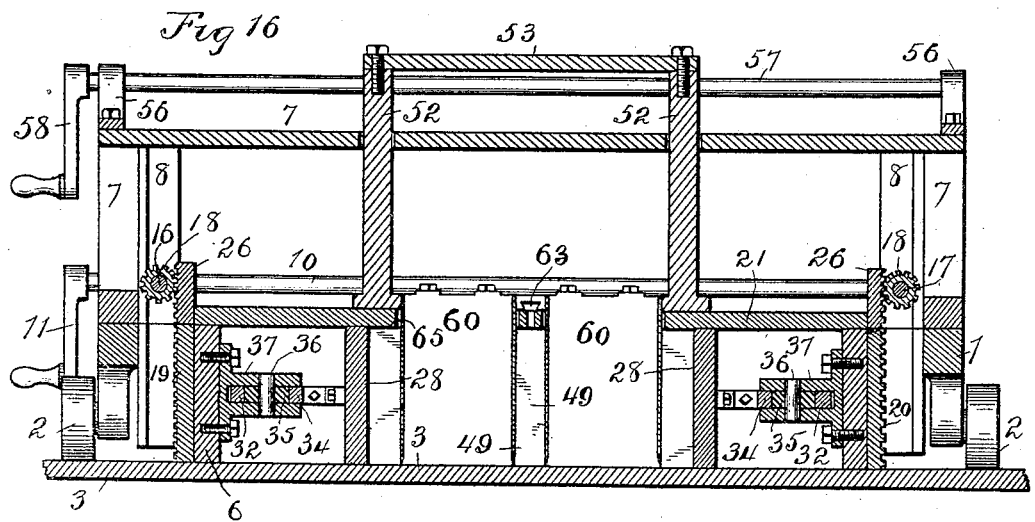
WITNESSES:
R. E. Hamilton
L. R. Barker
INVENTOR
Perry L. Britain
By Warren D. House,
His Attorney No. 773,709. PATENTED NOV. 1, 1904.
P. L. BRITAIN.
BUILDING BLOCK MOLDING MACHINE.
APPLICATION FILED AUG. 3, 1903.
NO MODEL. 9 SHEETS—SHEET 7.

WITNESSES:
R. E. Hamilton.
L. R. Barker.

INVENTOR
Perry L. Britain
By Warren L. House,
His Attorney.

No. 773,709. PATENTED NOV. 1, 1904.
P. L. BRITAIN.
BUILDING BLOCK MOLDING MACHINE.
APPLICATION FILED AUG. 3, 1903.
NO MODEL. 9 SHEETS—SHEET 8.
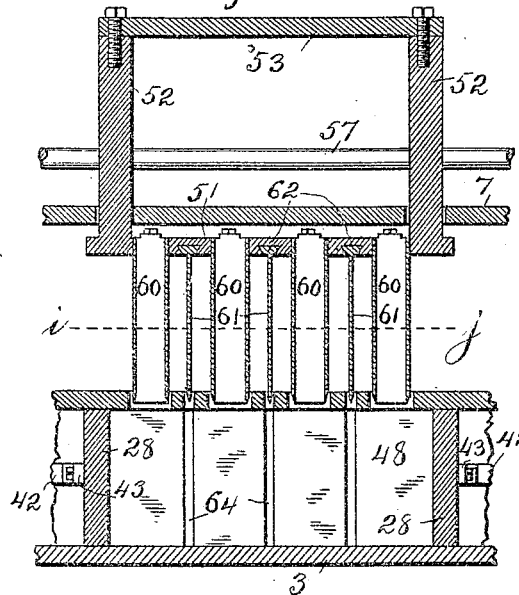
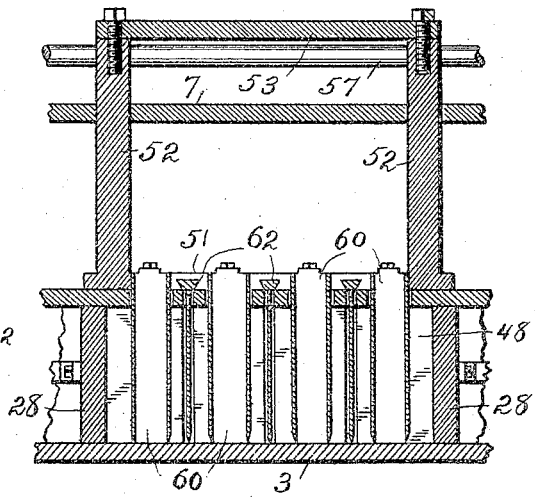
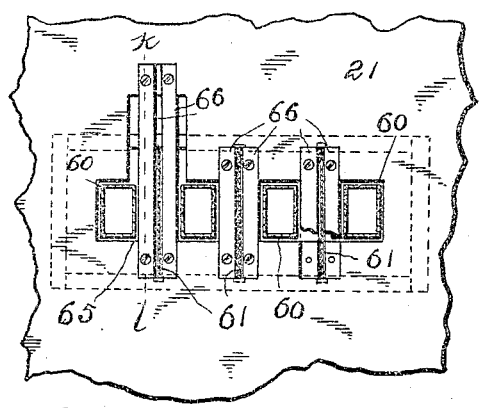
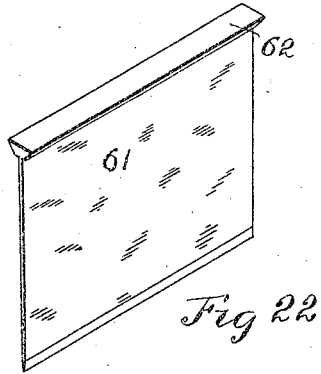
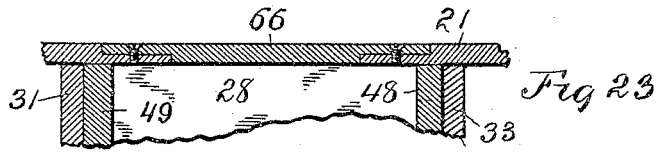
WITNESSES:
R. E. Hamilton
L. R. Barker
INVENTOR
Perry L. Britain
By Warren D. House
His Attorney No. 773,709. PATENTED NOV. 1, 1904.
P. L. BRITAIN.
BUILDING BLOCK MOLDING MACHINE.
APPLICATION FILED AUG. 3, 1903.
NO MODEL. 9 SHEETS—SHEET 9.

WITNESSES:
R. E. Hamilton.
L. R. Barker.

INVENTOR
Perry L. Britain
By Warren D. House
His Attorney

No. 773,709.

Patented November 1, 1904.

UNITED STATES PATENT OFFICE.

PERRY L. BRITAIN, OF BUSCH, OKLAHOMA TERRITORY.

BUILDING-BLOCK-MOLDING MACHINE.

SPECIFICATION forming part of Letters Patent No. 773,709, dated November 1, 1904.

Application filed August 3, 1903. Serial No. 168,044. (No model.)

*To all whom it may concern:*

Be it known that I, PERRY L. BRITAIN, a citizen of the United States, residing at Busch, in the county of Roger Mills and Territory of Oklahoma, have invented certain new and useful Improvements in Building-Block-Molding Machines, of which the following is a specification.

My invention relates to improvements in building-block-molding machines.

The object of my invention is to provide a molding mechanism by means of which the blocks may be molded upon a suitable support or base, the sides of the mold removed from the blocks to another position upon the said support, the molded blocks being left undisturbed where they have been molded until they have become set and hardened.

With the use of my invention, the sides of the mold being removed from the block instead of the block being removed from the mold, the block remains undisturbed where molded and is therefore not subjected to the injurious effects of being handled while in a soft or plastic state.

My invention provides, further, a machine with which the sides of the mold are vertically movable upon a supporting-frame to a position above the block which has been previously formed between the sides, the supporting-frame being horizontally movable upon a support which forms the bottom of the mold.

My invention provides, further, one or more cutting devices for cutting out and removing a portion of the interior of the molded block and forming a hollow space therein.

My invention provides, further, means by which the molded block may be cut into a plurality of parts each of which in itself forms a building-block.

My invention provides, still further, novel mechanism for laterally moving the sides of the mold to and fro.

My invention provides, still further, a machine having a plurality of side plates combined with means for laterally moving said plates, whereby they may be freed from the molded block, and means by which two oppositely-disposed side plates of the mold may be adjusted toward and from each other for the purpose of varying the length of the block to be molded.

My invention provides, further, novel mechanism for forming corner-blocks of different sizes.

Other novel features are hereinafter fully described and claimed.

Figure 2:
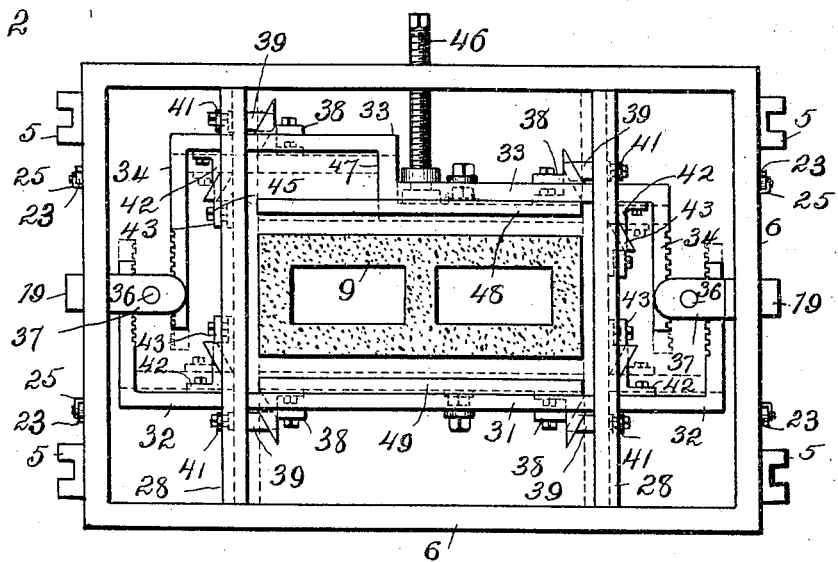
Figure 3:
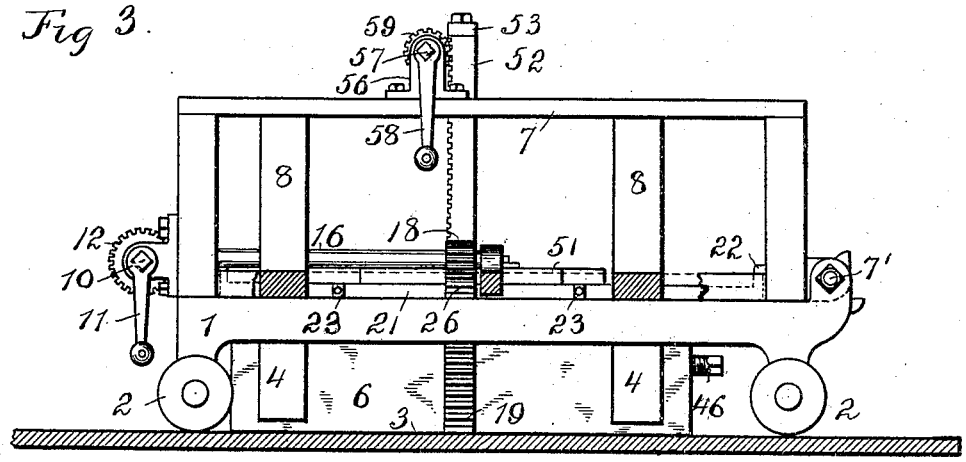
Figure 4:
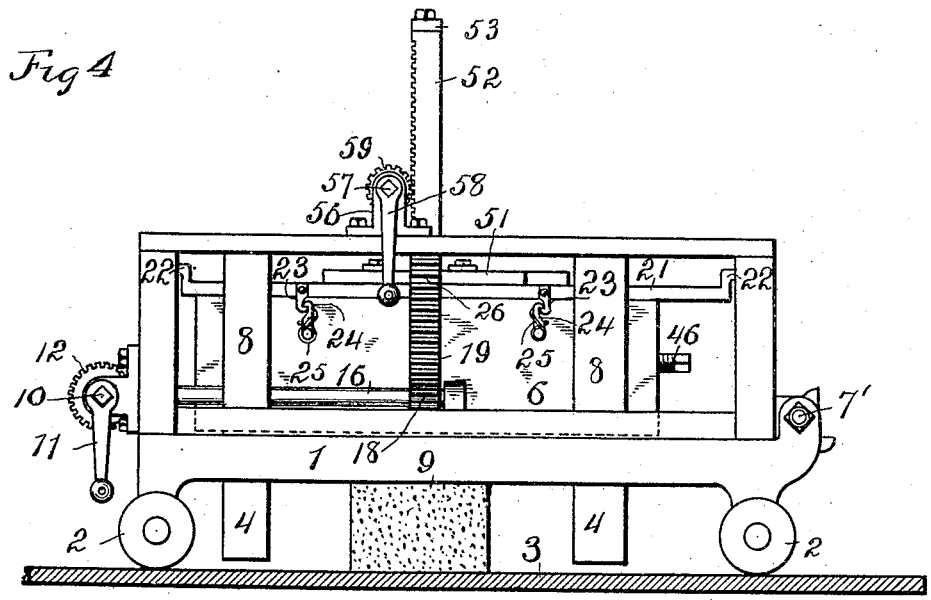

In the accompanying drawings, which illustrate my invention, Figure 1 is an end elevation view of the molding-machine, a portion of the framework being broken away and showing the sides of the mold resting upon the base and the tubular cutters in the elevated position. Fig. 2 is a top view having the swinging supporting-frame and parts connected therewith removed and showing a molded block between the sides of the mold, the sides being shown in the open position. Fig. 3 is an end elevation view, a portion of the framework being broken away and showing the mechanism for operating the tubular cutters and the mold-plate-supporting frame in the lower position. Fig. 4 is an end elevation view showing the mold-supporting frame and the mechanism for elevating the tubular cutters in the raised position, the molded block being shown upon the base which forms the bottom of the mold. Fig. 5 is an end elevation view showing the mold-supporting frame in the lower position and the swinging supporting-frame in the elevated position, a molded block being shown to the right of the machine, from which place the supporting-frame has just been moved for the purpose of forming a new block. Fig. 6 is a top view of portions of the side plates of the mold, a corner-block being shown in the position in which it is molded between the side plates. In this view is shown one of the supplemental plates used for varying the width of the corner-block. Fig. 7 is a top view partially broken away and having the swinging supporting-frame and connected parts removed. In this view is shown a molded block with the sides of the mold in the closed position, the tubular cutters and knives for severing the block being shown in horizontal cross-section. Fig. 8 is a perspective view of one of the wedges mounted upon the end mold-plates. Fig. 9 is a similar view of one of the wedges mounted upon the side mold-plates.

Figure 17:
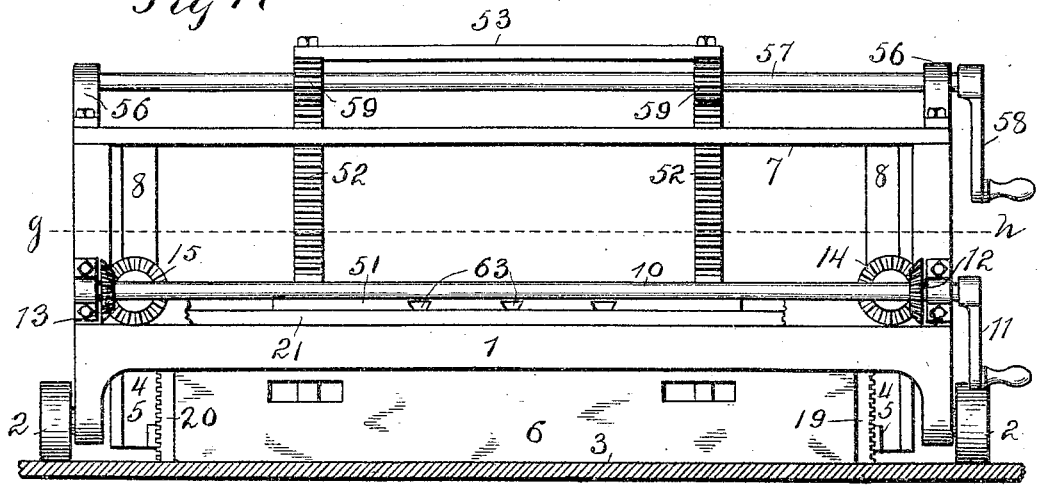
Figure 18:
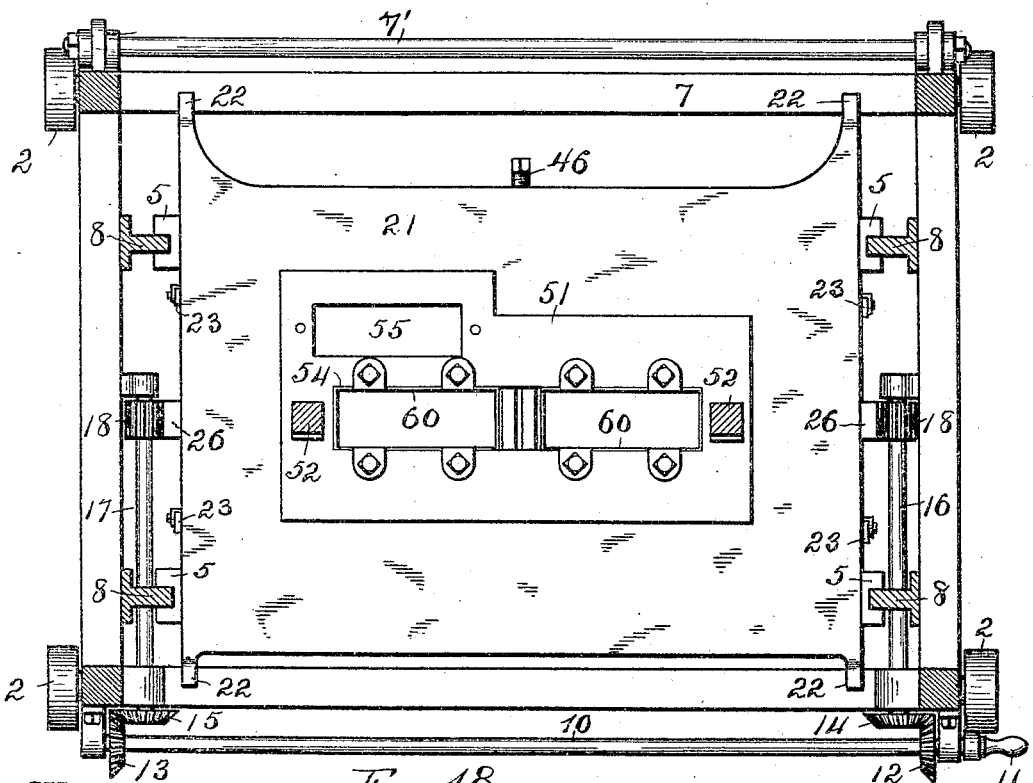
Figure 24:
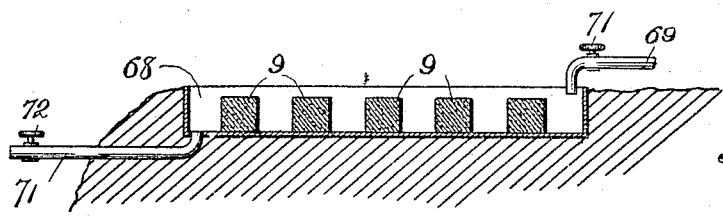
Figure 25:
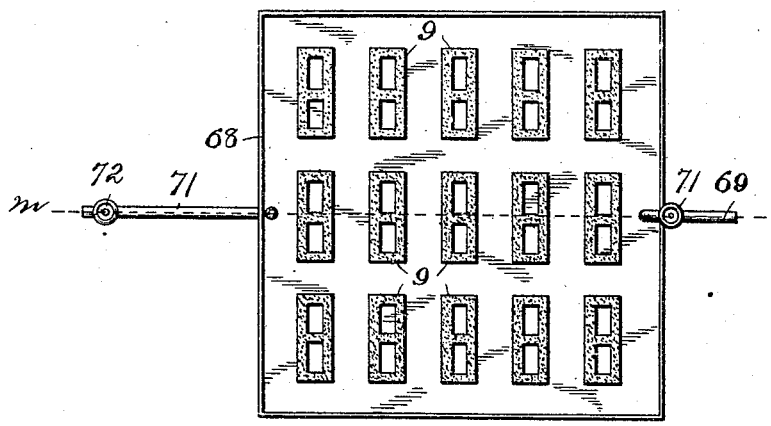
Figure 26:
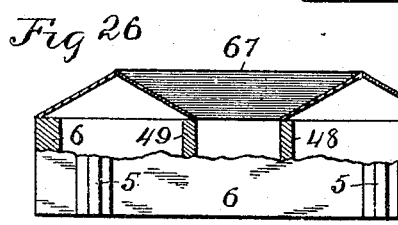
Figure 27:
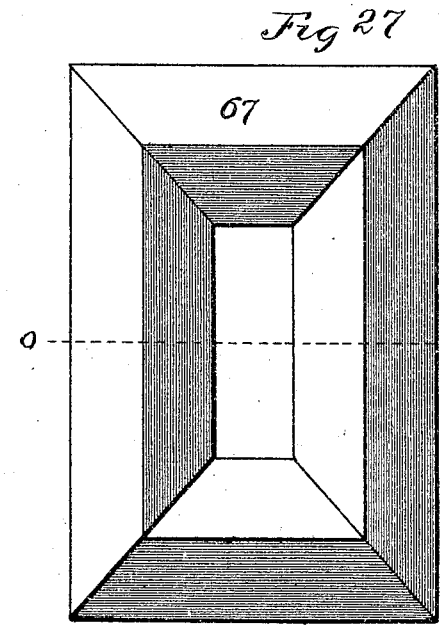
Figure 28:
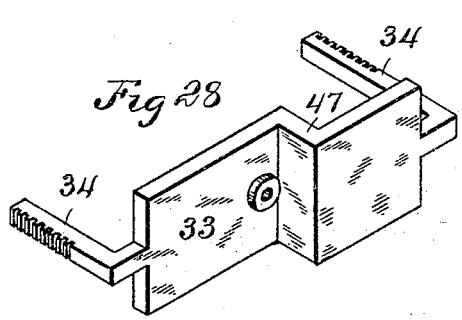

Fig. 10 is a similar view of one of the right-angled supplemental plates adapted to be secured to the recessed mold-plate. Fig. 11 is a perspective view of another form of supplemental mold-plates. Fig. 12 is a vertical sectional view taken on the dotted line *a b* of Fig. 7 and showing the swinging frame and parts connected therewith in the lower position. Fig. 13 is a view similar to Fig. 12 and taken upon the vertical plane indicated by the dotted line *c d* in Fig. 7. Fig. 14 is a perspective view of one of the plates supporting one of the side plates of the mold. Fig. 15 is a vertical sectional view taken on the vertical plane indicated by the dotted line *e f* in Fig. 7, the supporting-frame and side mold-plates mounted thereon being shown in the lower position. Fig. 16 is a view similar to Fig. 15, the tubular cutters and their supporting mechanism, which are shown in the elevated position in Fig. 15, in this view being shown in the lower position. Fig. 17 is a side elevation view showing the mold-plate-supporting frame and the tubular-cutter-supporting mechanism in the lower position. Fig. 18 is a horizontal section view taken on the dotted line *g h* of Fig. 17. Fig. 19 is a vertical sectional view of a portion of the side mold-plates, the tubular-cutter mechanism, and connected parts, the tubular-cutter mechanism being shown in the elevated position. Fig. 20 is a view similar to that shown in Fig. 19, the tubular-cutter mechanism being shown in the lower position. Fig. 21 is a horizontal sectional view taken on the dotted line *i j* of Fig. 19. Fig. 22 is a perspective view of one of the knives used for cutting the molded block. Fig. 23 is a vertical sectional view taken on the dotted line *k l* of Fig. 21, the tubular cutter being omitted. Fig. 24 is a vertical sectional view upon the dotted line *m n* of Fig. 25, showing the receptacle in which the molded blocks are retained in a moistened condition until hardened. Fig. 25 is a plan view of the receptacle for holding the molded blocks. Fig. 26 is a view, partly in elevation and partly in section, of the frame for supporting the side plates of the mold and showing the feed-hopper mounted thereupon, the portion shown in section being taken on the dotted line *o p* of Fig. 27. Fig. 27 is a plan view of the feed-hopper. Fig. 28 is a perspective view of the recessed side mold-plate.

Similar characters of reference indicate similar parts.

1 indicates the wheeled or laterally-movable supporting-frame of any desired shape, but preferably rectangular, as shown, and provided with wheels 2, adapted to rest upon a horizontal flat base or support 3, which also is adapted to form the bottom of the mold in which the block is formed. Upon the supporting-frame 1, on the inner sides thereof, are provided vertical guiding-strips 4, on which vertically slide grooved guides 5, provided upon the ends of the rectangular mold-plate-supporting frame 6. Upon the upper rear side of the frame 1 is secured a horizontal longitudinally-disposed rod 7', to which is hinged the rear lower side of the tubular-cutter-supporting frame 7. When it is desired to fill the mold to form a block, the frame 7 is swung to the vertical position shown in Fig. 5. At other times the frame 7 is placed in the position shown in Fig. 4, in which it is in a horizontal position resting upon the frame 1. The supporting-frame 7 is provided at its ends with vertical guiding-strips 8, similar to and (when the frame is as shown in Fig. 4) in vertical alinement with the guides 4. When in this position, the mold-frame 6 can be slid from the guides 4 onto the guides 8 and there held supported above the upper side of the frame 1 and above the molded block 9, as shown in Fig. 4. The means employed for elevating and lowering the mold-supporting frame 6 are best shown in Figs. 3, 4, 15, 17, and 18. Disposed longitudinally at the forward side of the supporting-frame 7 and rotatable in bearings provided on said frame is a horizontal shaft 10, provided at one end with a crank-handle 11 for rotating the said shaft. Upon said shaft near its ends are mounted and rotatable therewith two bevel gear-wheels 12 and 13, which mesh, respectively, with the bevel gear-wheels 14 and 15, mounted upon and rotatable with the two transverse horizontal shafts 16 and 17, respectively, said shafts being mounted in suitable bearings provided, respectively, upon the inner sides of the ends of the frame 7. Upon the shafts 16 and 17 are mounted, one upon each shaft near its rear end, the two pinions 18, adapted to engage, respectively, the two vertical racks 19 and 20, secured, respectively, upon the ends of the mold-frame 6. Vertically movable upon the frame 7 is a horizontal stripping-plate 21, provided at its forward and rear edges with projections 22, which are adapted to rest upon the frame 7 and prevent the said plate falling below the frame 7. This plate 21 normally rests upon the upper side of the frame 6, to which it may be releasably secured by means of downwardly-extending hooked lugs 23, provided at each end of the plate and adapted to engage, respectively, hooks 24, pivoted, respectively, upon the ends of the frame 6. Wire springs 25, secured each at one of its ends to the frame 6 and having each its other end bearing upon the adjacent hook 24, serve to cause the hooks 24 to be normally held in position to be engaged by the lugs 23. The plate 21 is provided at each end with a vertical rack 26, adapted to aline when the plate 21 is secured in the position shown in Fig. 4 with the racks 19 and 20, and thus be positioned to be engaged by the pinions 18. Vertical movement of the frame 6 and the plate 21 is obtained as follows: The crank-handle 11 is rotated in the proper direction, thus imparting rotation to the pinions 18 and 19 by means of the shaft 10, gear-wheels 12, 13, 14, and 15, and the shafts 16 and 17, respectively. The pinions 18 being rotated force the racks 19, 20, and 26 vertically, the direction upward or downward being determined by the direction in which the crank-handle 11 is turned.

I will now describe the side mold-plate mechanism supported by the frame 6.

Referring to Figs. 2, 12, 13, 15, 16, and 7, the reference-numeral 28 indicates, respectively, two vertical transverse parallel plates mounted within the frame 6, the ends of the plates being mounted in and movable laterally in longitudinal slots 29, provided in the front and rear sides of the frame 6. In Fig. 7 the frame 7 is broken away, so as to disclose two of said slots. The plates 28 are each provided with two longitudinal slots 40. 31 denotes the forward vertical side plate of the mold mechanism. This plate is provided at its ends with two right-angled arms 32, one at each end of the plate, said arms being disposed within and extending through the slots 40 on the forward ends of the plates 28, in which the said right-angled arms are movable forward and backward. The rear mold-plate 33 is also a vertical plate disposed opposite to the mold-plate 31 and provided at each end with an arm 34, said arms 34 being extended through the rear slots 40 in the plates 28 and movable forward and backward therein. Said arms 34 are also right-angled arms, the outer portion of each arm extending parallel with the plates 28 toward and inside of the inwardly-extending portion of the adjacent arm 32. The transverse portions of the arms 32 and 34 extend each beyond horizontal pinions 35, which are respectively mounted one pinion between two adjacent arms 32 and 34 upon vertical pins 36, mounted, respectively, in inwardly-extending brackets 37, secured, respectively, one upon each inner side of the ends of the frame 6. The outsides of the transverse portions of the arms 34 and the inner sides of the corresponding portions of the arms 32 are provided with gear-teeth which mesh with the pinions 35. When the rear plate 33 is moved with its arms 34 forward and backward, the pinions 35 will be rotated, and thus force the forward plate 31 in a direction opposite to that in which the plate 33 is moved. In order that the end plates 28 may be laterally moved simultaneously with the movement forward and backward of the plates 31 and 33, the following mechanism is provided.

Referring to Figs. 2, 7, 8, 9, 12, and 13, 38 indicates four lugs secured, respectively, two to the rear side of plate 33 and two to the forward side of plate 31. Said lugs are provided each with an inclined face adapted to have contact with the inclined face of an adjacent bolt 39. Four bolts 39 are provided, each being mounted in a longitudinal slot 40, of which each plate 28 is provided with two. The said bolts 39 extend through the plates 28 and are each screw-threaded upon its outer end, nuts 41 being mounted on said screw-threaded bolts, one on each bolt, and upon the outside of the plates 28. The said bolts 39 may be adjusted lengthwise of the plates 28 by loosening the nuts 41. When the bolts are properly positioned, they may be secured in such position by tightening the nuts 41. One of the bolts 39 is shown in Fig. 8. Upon the inner sides of the plates 31 and 33 and outside the plates 28 are secured two upon each plate lugs 42, having inclined faces similar to the lugs 38. Four adjustable lugs 43, one of which is shown in Fig. 9, are mounted two upon the outside of each plate 28 and between the plates 31 and 33. Each of said lugs is provided with an inclined face adapted to rest against the inclined face of the lug 42 adjacent thereto. Each lug 43 is provided with a longitudinal slot 44, in which is inserted a screw-threaded bolt 45, the inner end of which engages the screw-threaded hole provided therefor in the adjacent plate 28. When it is desired to change the width of a block 9, such may be done by adjusting the lugs 43 and the bolts 39 lengthwise of the plates 28 to the position desired. The disposition of the lugs 42 relative to the lugs 43 and the disposition of the lugs 38 relative to the bolts 39 when the mold-plates 28, 31, and 33 are in position for molding a block are shown in Fig. 7. The positions of said lugs and bolts when the mold-plates are moved laterally from the block are shown in Fig. 2. For imparting lateral movement to the mold-plates a horizontal transverse screw-threaded bolt 46 is provided. This bolt is rotatably fitted at its inner end to the rear mold-plate 33, which is provided with a hole therethrough in which is mounted the end of the bolt 46, the inner end of which is provided with a head to prevent the bolt being withdrawn from the plate. The bolt 46 extends through a screw-threaded hole in the rear side of the mold-supporting frame 6. By turning the bolt 46 in the proper direction the plate 33 may be moved forward and backward, thus, as already described, moving the plate 31 in the opposite direction. When the plate 33 is moved rearwardly, the lugs 38 thereon and the lugs 38 on the plate 31 have their inclined faces forced against the oppositely-inclined faces on the bolts 39 in the plates 28, and thus cause the said plates 28 to be moved outwardly when the plates 33 and 31 are moved outwardly. When the plates 31 and 33 are moved inwardly toward the position shown in Fig. 7, the inclined faces of the lugs 42 are forced against the oppositely-inclined faces of the lugs 43 on the plates 28, and the plates 28 are thus forced to move inwardly. It may be seen, therefore, that when the bolt 46 is properly turned the side plates 28, 31, and 33 may be simultaneously moved inwardly or outwardly. I prefer to make the plate 33 with an outwardly-extending right-angled portion at one end and denoted by 47. With a plate so formed corner-blocks may be made as well as straight blocks. For forming straight rectangular blocks I provide a straight flat plate 48, (shown in Figs. 7 and 11,) which is secured in a vertical position against the inner side of the plate 33 and which extends from the inside of one plate 28 to the inside of the other plate 28. A corresponding supplemental plate 49 is similarly secured to the inner side of the plate 31. If it is desired to form a corner-block the full width of the recess 47, the plate 48 is removed. If it is desired to form a corner-block having its lateral extension narrower than the recessed portion 47, a right-angled supplemental mold-plate 50, such as is shown in Fig. 6, is secured to the inner side of the plate 33, the short side of the plate 50 extending into and being of the length corresponding to the depth of the recessed portion of the plate 33. The length of the longer portion of the plate 50 is that required to make the lateral extension of the corner-block of the width desired.

The mechanism for forming the hollow spaces or holes in the blocks will now be described.

Upon the upper side of a horizontal plate 51, which forms a cross-head and which is disposed above the plate 21, are provided two parallel vertical posts 52, which are vertically movable in openings provided therefor in the upper side of the swinging frame 7. A horizontal plate 53 is secured at its ends to the upper ends of the posts 52. The cross-head mechanism is best shown in Figs. 12, 13, 15, 16, 17, and 18. Said cross-head 51 is provided with a hole 54 therethrough, through which are inserted the tubular cutters described later. A second hole, 55, is provided through the cross-head to receive a tubular cutter adapted to cut the material from the lateral extension of a corner-block. Vertical movement is imparted to the cross-head 51 as follows: Rotatably mounted in bearings 56 on top of the frame 7 is mounted a longitudinal horizontal shaft 57, to one end of which is secured a crank-handle 58. Secured upon and rotatable with the shaft 57 are two pinions 59, which mesh, respectively, with rack-teeth provided in the adjacent sides of the posts 52. By rotating the shaft 57 by means of the crank-handle 58 the cross-head may be elevated or lowered. Any suitable means may be employed for sustaining the cross-head in the upper position. In any desired manner may be secured in the hole 54 in the cross-head one or more tubular vertical cutters 60, which are adapted when the cross-head is lowered to pierce the block 9, which has been formed in the mold. When the cross-head is then elevated, the cutters 60 will carry with them the material which has been forced into them. This material may afterward be removed, as hereinafter described. Any desired number of cutters may be used, and their form in cross-section may be whatever desired.

It is sometimes desired to divide a block into a plurality of parts each of which will form a building-block by itself. In order to do this, I provide one or more vertical transverse cutting blades or knives 61, the upper edge of each of which is provided with a dovetail-shaped flange 62, adapted to enter and be held in a correspondingly-shaped transverse groove 63, a plurality of which are provided on the under side of the cross-head 51. The knives 61 are as wide or wider than the width of the block desired, and they may be guided in the mold by means of vertical grooves 64, provided on the inner sides of the supplemental mold-plates. The stripper-mold plate 21 is provided in its top with a hole 65 therethrough, through which the tubular cutters 60 and the knives 61 may pass. Upon the upper side of the plate 21 at each side of the knives 61 are provided transverse plates 66, which serve to retain the cementitious material in the mold when the cutters 60 and the knives 61 are withdrawn upwardly. These plates are shown in Figs. 21 and 23.

In Figs. 15, 16, and 18 I have shown two cutters 60 as being used, so as to cut out two cores or holes in the block 9, while in Figs. 7, 19, and 20 four cutters are shown.

Referring to Figs. 26 and 27, 67 indicates the feed-hopper, comprising a rectangular body having four downwardly and outwardly sloping sides, the outer edges of which rest upon the upper edges of the sides of the frame 6. The hopper is provided with a rectangular hole adapted to be directly over the top of the mold. The hopper around said hole has four inwardly and downwardly sloping sides for guiding the concrete material into the mold. The shape of the hopper is such that the cementitious material is prevented from getting between the mold-plates and the mold-supporting frame 6. For making corner-blocks a hopper of the proper form may be employed.

68 denotes a water-receptacle the base of which is adapted to form the bottom of the mold and upon which the blocks are molded and allowed to rest until set and hardened. Water may be admitted to the receptacle 68 in any desired manner. Any convenient means may be employed to discharge the water from the said receptacle. In the drawings I have shown a water-pipe 69, shown as discharging into the receptacle 68 at one side thereof. A discharge-pipe 70 is also shown leading downward from the receptacle floor or bottom. In the use of this part of my invention the blocks 9 are molded, as described hereinafter, upon the floor of the receptacle. The cock 71 is then turned to admit water through the pipe 69 into the receptacle. When the blocks 9 are covered with water, the water is shut off by operating the cock 71 and the blocks permitted to stand in the water until hardened. When well set, the cock 72 in the pipe 70 is opened and the water is permitted to drain from the receptacle. The blocks 9 may then be removed.

In forming a block the mechanism is operated as follows: The supporting-frame 1 is moved on the base 3 to the place desired to mold a block. The crank 11 is then turned in a direction such that the mold-supporting frame 6 will be lowered upon the base 3, as shown in Fig. 1. The frame 7 is then swung to the vertical position, as shown in Fig. 5, after which the bolt 46 is turned in a direction such that the sides of the mold will be as shown in Fig. 7—that is, in the closed position. The material of which the block is to be made is then placed into the mold upon the base 3 and between the closed sides of the mold, the hopper 67 being employed, as shown in Fig. 26, through which to feed the cementitious material. After the material for the block has been placed in the mold and properly tamped therein the top of the block molded therein is smoothed on top even with the upper edges of the mold-plates. Then the frame 7 is swung to the position shown in Fig. 1, the hooks 24 on the frame 6 being caused to engage the lugs 23 on the plate 21, and thus cause the plate 21 to be tightly clamped to the frame 6. The crank-handle 58 is then turned in a direction such that the cross-head 51 will be caused to be lowered, as already described, from the position shown in Fig. 3 to that shown in Fig. 3. The cross-head 51 in lowering will, as before described, force the tubular cutters 60 through the block 9, thus causing the material cut out thereby to enter the tubular cutters 60, by which it is retained, the cutters, if necessary, being made slightly converging toward the lower end. The crank-handle 58 is then turned so as to elevate the cross-head, thus withdrawing the cutters 60, which carry with them the material cut out, and thus providing hollow spaces in the block 9. The cross-head at this time is in the position shown in Fig. 1. The bolt 46 is then turned in a direction such that the sides of the mold will be moved outward to the position shown in Fig. 2, thus freeing the sides of the mold from the block 9, which is now complete and can be permitted to rest where formed until it has become set and hard. The crank-handle 11 is then turned in a direction such that the mold-frame 6 will be elevated, together with the mold-plates, to the position shown in Fig. 4, thus leaving the block 9 upon the base free from the frame 6 and mold-plates which are now above the block. The frame 1 is then moved upon its wheels to the place on said base 3 at which it is desired to form another block. The crank-handle 11 is then turned so as to lower the mold-frame 6, as before described, so that it will again rest upon the base 1. The material in the cutters 60 after the bolt 46 has been turned so as to force the mold sides to the position shown in Fig. 7 is then forced downwardly out of the cutters and permitted to fall into the mold. The hooks 24 are then released from the lugs 23 on the plate 21, thus freeing the said plate from the frame 6. The frame 7 is then swung to the position shown in Fig. 5, after which fresh material is placed in the mold for forming a block, and then the operation already described is repeated. In this manner a row or a series of rows of blocks may be formed upon the base 3, on which they can rest undisturbed until they have become set and hardened. Danger of breakage of the blocks in the process of making is thereby avoided. If it is not desired to cut the block into a plurality of parts, the knives 61 may be removed from the cross-head 51. So, also, one or more tubular cutters or all of them may be removed from the cross-head if no hole is desired in the block.

My invention may be modified in many ways without departing from its spirit.

Having thus described my invention, what I claim, and desire to secure by Letters Patent, is—

1. In a building-block-molding machine, the combination with a supporting-frame of a mold movable upward and downward upon said supporting-frame, and means for removing a core from the block formed in said mold.

2. In a building-block-molding machine, the combination with a supporting-frame movable from one place to another upon a suitable support, of a mold carried by and movable upward and downward upon said supporting-frame and adapted to rest upon said support while the block is being formed in the mold and means for removing a core from the block.

3. In a building-block-molding machine, the combination with a suitable base adapted to form the bottom of a mold, of a supporting-frame movable to and fro upon said support, plates adapted to form the sides of the mold, means for moving the said plates upward and downward upon said supporting-frame and means for removing a core from the block formed in said mold.

4. In a building-block-molding machine, the combination with a base adapted to form the bottom of a mold, of a supporting-frame mounted thereon, plates carried by the said supporting-frame adapted to form the sides of the mold, means for moving said plates upward and downward upon said supporting-frame, means for simultaneously laterally moving certain of said plates and means for removing a core from the block formed between the plates.

5. In a building-block-molding machine, the combination with a base adapted to form the bottom of a mold, of a supporting-frame horizontally movable thereupon, plates carried by said supporting-frame and adapted to form the sides of the mold, means for moving said plates upward and downward upon the said supporting-frame, and means for forming a hollow space within the block formed upon said base and between said plates.

6. In a building-block-molding machine, the combination with a base adapted to form the bottom of a mold, of a supporting-frame mounted thereon, plates carried by said supporting-frame and adapted to form the sides of the mold, means for moving said plates upward and downward upon said supporting-frame, means for moving certain of said plates simultaneously in a lateral direction, and means for forming a hollow space within the block formed on said base and between said plates.

7. In a building-block-molding machine, the combination with a base adapted to form the bottom of a mold, of a supporting-frame horizontally movable thereupon, plates movable upward and downward upon said supporting-frame and adapted to form the sides of the mold, and means for forming a hollow space within the block formed upon said base and between said plates.

8. In a building-block-molding machine, the combination with a base adapted to form the bottom of the mold, of a supporting-frame horizontally movable thereupon, plates movable upward and downward upon said supporting-frame and adapted to form the sides of the mold, means for laterally moving certain of said plates, and means for forming a hollow space within the block formed upon said base and between said plates.

9. In a building-block-molding machine, the combination with a supporting-frame, of plates carried thereupon and adapted to form the sides of the mold, means for simultaneously moving the said plates upward and downward upon the supporting-frames, and means for removing a core from the block formed between said plates.

10. In a building-block-molding machine, the combination with a supporting-frame, of plates movable upward and downward thereupon and adapted to form the sides of the mold, and means for removing a portion of the material from the block molded between said plates and thus forming a hollow space in said block.

11. In a building-block-molding machine, the combination with a supporting-frame, of plates movable thereon and adapted to form the sides of the mold, and means for cutting out and removing a core from the block formed between said plates.

12. In a building-block-molding machine, the combination with a supporting-frame, of laterally-movable plates carried thereon and adapted to form the sides of the mold, and means for cutting out and removing a core from the block formed between said plates.

13. In a building-block-molding machine, the combination with a supporting-frame, of laterally-movable plates movable upward and downward upon the supporting-frame and adapted to form the sides of the mold, and means for cutting out and removing a core from the block formed between said plates.

14. In a building-block-molding machine, the combination with a base adapted to form the bottom of the mold, of a supporting-frame mounted thereupon, plates carried by the said supporting-frame and adapted to form the sides of the mold, means for cutting out and removing a core from the block formed between said plates and upon said base.

15. In a building-block-molding machine, the combination with a base adapted to form the bottom of the mold, of a supporting-frame mounted thereupon, plates movable upward and downward upon said supporting-frame and adapted to form the sides of the mold, and means for cutting out and removing a core from the block formed between said plates of the said base.

16. In a building-block-molding machine, the combination with a base adapted to form the bottom of the mold, of a supporting-frame mounted thereupon, laterally-movable plates movable upward and downward upon said supporting-frame, and adapted to form the sides of the mold, and means for cutting out and removing a core from the block formed between said plates and upon said base.

17. In a building-block-molding machine, the combination with a base adapted to form the bottom of the mold, of a supporting-frame mounted thereupon, plates carried by the supporting-frame and adapted to form the sides of the mold, a tubular cutter, and means for forcing the said cutter into and withdrawing it from a block formed upon said base and between said plates.

18. In a building-block-molding machine, the combination with a base adapted to form the bottom of the mold, of a supporting-frame mounted thereupon, plates movable upward and downward upon said supporting-frame and adapted to form the sides of the mold, and a tubular cutter movable upward and downward upon said supporting-frame and adapted to be forced into and withdrawn from a block formed upon said base and between said plates.

19. In a building-block-molding machine, the combination with a base adapted to form the bottom of the mold, of a supporting-frame horizontally movable thereupon, plates movable upward and downward upon said supporting-frame and adapted to form the sides of the mold, a tubular cutter carried by the supporting-frame and movable upward and downward between said plates, and means for moving said cutter and said plates upward and downward upon said supporting-frame.

20. In a building-block-molding machine, the combination with a base adapted to form the bottom of the mold, of a supporting-frame horizontally movable thereupon, plates movable upward and downward upon said supporting-frame and adapted to form the sides of the mold, means for elevating said plates above the block formed upon the base and between said plates, and means for forming a hollow space in said block.

21. In a building-block-molding machine, the combination with a horizontally-movable supporting-frame, of a mold-plate-supporting frame vertically movable upon the other supporting-frame, side plates carried by said vertically-movable supporting-frame and adjustable laterally thereupon, and means for cutting out and removing a portion of the block formed between said laterally-adjustable side plates.

22. In a building-block-molding machine, the combination with a horizontally-movable supporting-frame, of mold side plates carried by said frame, a swinging supporting-frame hinged to said horizontally-movable supporting-frame, and means for vertically moving the said mold side plates upon said supporting-frames.

23. In a building-block-molding machine, the combination with a horizontally-movable supporting-frame, of mold side plates carried by said frame, a swinging supporting-frame hinged to said horizontally-movable supporting-frame, means for vertically moving the said mold side plates upon said supporting-frame, a tubular cutter carried by said swinging frame and adapted to be forced into and withdrawn from the block formed between the said mold side plates, and means for so moving said tubular cutter.

24. In a building-block-molding machine, the combination with a horizontally-movable supporting-frame, of a mold-plate-supporting frame, means for vertically moving the latter frame upon the horizontally-movable frame, mold side plates carried by said vertically-moving frame, a tubular cutter carried by said horizontally-movable supporting-frame and adapted to be forced into and withdrawn from the block formed between said mold side plates, means for vertically moving the said tubular cutter, a horizontal plate adapted to be mounted upon said side plates and said vertically-movable frame and provided with openings for the passage therethrough of said tubular cutter, and means for releasably locking said horizontal plate to the vertically-movable frame.

25. In a building-block-molding machine, the combination with a horizontally-movable supporting-frame provided with suitable guides, of a swinging frame hinged to said supporting-frame and provided with guides adapted to be in alinement with the guides upon the other supporting-frame when the two frames are properly positioned, a mold-plate-supporting frame vertically movable upon the guides of the other two supporting-frames, means for so moving the said mold-plate-supporting frame, mold side plates carried by said mold-plate-supporting frame, means for laterally adjusting said mold side plates, a tubular cutter reciprocatively mounted upon said swinging frame and adapted to be forced into and withdrawn from the block formed between said mold side plates, and means for reciprocating said tubular cutter.

26. In a building-block-molding machine, the combination with means for molding the block, of a reciprocatively-mounted knife, means for forcing said knife through the molded block thus dividing the block into a plurality of parts, a plurality of tubular cutters disposed one at each side of said knife, and means for reciprocating said cutters through the molded block.

27. In a building-block-molding machine, the combination with means for molding the block, of a plurality of knives reciprocatively mounted, means for forcing the said knives through the molded block, a plurality of tubular cutters, and means for forcing the said tubular cutters into and withdrawing them from the respective parts of the block severed by said knives.

28. In a building-block-molding machine, the combination with means for molding the block, of a supporting-frame, a knife reciprocatively mounted upon said supporting-frame and adapted when moved in the proper direction, to sever the said molded block into two parts, a tubular cutter mounted upon said supporting-frame and reciprocated with said knife and disposed so as to pierce one of said parts of said block when moved in the proper direction.

29. In a building-block-molding machine, the combination with a reciprocatively-mounted cross-head, of a plurality of vertical knives carried by and independently detachable from said cross-head and adapted to sever a molded block into a plurality of parts, means for molding the block and means for forming a hollow space in each of said severed parts.

30. In a building-block-molding machine, the combination with a mold-plate-supporting frame, of mold side plates mounted therein, and a feed-hopper having a feed-opening therethrough and resting upon said frame, the upper side of the hopper adjacent to said opening slanting downward toward the same and the outer portion of the upper side of said hopper inclining downward and outward.

In testimony whereof I affix my signature in presence of two witnesses.

PERRY L. BRITAIN.

Witnesses:
P. C. HUGHES,
C. J. HUGHES.